United States Patent [19]

Tanaka et al.

[11] 4,394,576

[45] Jul. 19, 1983

[54] APPARATUS FOR DETECTING THE LOCATION OF INCIDENT RADIATION

[75] Inventors: Eiichi Tanaka, Mitaka; Norimasa Nohara; Hideo Murayama, both of Chiba; Kenji Ishimatsu, Abiko; Akira Ogushi, Mito; Katsumi Takami, Tokyo, all of Japan

[73] Assignees: National Institute of Radiological Sciences, Chiba; Hitachi Medical Corporation, Tokyo, both of Japan

[21] Appl. No.: 191,870

[22] Filed: Sep. 29, 1980

[30] Foreign Application Priority Data

Sep. 29, 1979 [JP] Japan ................................ 54-124742

[51] Int. Cl.³ .............................................. G01T 1/20
[52] U.S. Cl. ..................................... 250/366; 250/367
[58] Field of Search ............ 250/361 R, 363 S, 363 R, 250/366, 367, 368, 369, 445 T

[56] References Cited

U.S. PATENT DOCUMENTS 3,720,831  3/1973  Miraldi .................................. 250/366
3,898,463  8/1975  Noakes .................................. 250/367
4,267,452  5/1981  Govaert ................................ 250/368
4,292,538  9/1981  Carlson ................................ 250/367

Primary Examiner—Alfred E. Smith
Assistant Examiner—Janice A. Howell
Attorney, Agent, or Firm—Gerald J. Ferguson, Jr.; Joseph J. Baker

[57] ABSTRACT

An apparatus for a detecting the location of incident radiation comprises at least one pair of assembly comprised of a scintillation crystal consisting of a plurality of crystal segments, a pair of photo-multiplier tubes optically coupled to the scintillation crystal so as to be able to detect a scintillation produced in any one of these crystal segments. These plural crystal segments are coupled to each other in such manner that any scintillation produced in any single crystal segment will cause the photo-multiplier tubes to deliver substantially a same output irrespective of the illuminating position within this crystal segment, and also that scintillations produced in the respective crystal segments will cause the photo-multiplier tubes to deliver outputs which are different in level for the respective crystal segments.

21 Claims, 20 Drawing Figures

APPARATUS FOR DETECTING THE LOCATION OF INCIDENT RADIATION

BACKGROUND OF THE INVENTION (a) Field of the Invention:

The present invention relates to an apparatus provided with a scintillation crystal and photo-multiplier tubes for detecting the location of a radiation incident to the scintillation crystal.

(b) Description of the prior art:

As the apparatus utilizing detectors for detecting the location of incident radiation which are used in the field of nuclear medicine, there are the well known auto-fluoroscope developed by Bender and Blau, and the scintillation camera developed by Anger. The former radiation-location detector is comprised of a plurality of individual small-size radiation detectors which are closely arranged in a planar or linear fashion, whereas the latter is arranged so that a single large scintillation crystal is embraced by a plurality of photo-multiplier tubes, so that from the magnitude of those outputs of the respective photo-multiplier tubes which are delivered when an incident gamma ray is detected, the location of this incident gamma ray is determined.

Many of those positron type of single photon type emission computed tomography apparatuses which have been put to practice in recent years have the arrangement that a plurality of small-size radiation detectors, especially scintillation counters, are arranged in a ring form to provide a location detector unit. Moreover, there has been proposed an developed concept to arrange such a ring detector in a plurality of layers to perform tomography of a plurality of slices simultaneously. Thus, in order to meet such requirement, it is necessary to arrange a large number of detectors in a narrow space. Also, in order to reduce the number of component parts, and/or to reduce the dimensions of the detectors per se to materialize such congested arrangement of a number of the detectors, there has been proposed to replace individual detectors by a small-size Anger-type location detectors. FIG. 1 is an explanatory perspective view showing the essential portion of such ring detector unit. Reference numeral 1 represents a collimator; 2 an Anger-type location detector; 3, 4 and 5 represent major components contained in a location detector, i.e. a scintillation crystal, photo-multiplier tubes, and a location detecting circuit, respectively. The location detector units 2 are arranged in a ring-like fashion, surrounding an objective for tomography, in the same way as that for the positron-type CT (computed tomography) having an ordinary ring-type arrangement. The collimator 1 is intended for removal of such unnecessary gamma ray that is incident to detector from outside of the intended slices. In FIG. 1, there are shown five doughnut-shape zinc plates. Each space defined by two adjacent zinc plates constitute a slice. There are seen four of such slices. Strictly speaking, arrangement of detectors in a ring form ought to be such that one detector is positioned for each slice, so that there are needed four detectors for four slices. In the conventional arrangement shown in FIG. 1, however, a single scintillation crystal 3 covers the spaces which are for the four scintillation crystals constituting four detectors. However, with a single scintillation crystal as shown, it will be understood that, even when the crystal 3 has detected the presence of incidence of a gamma ray, it is not possible to make cognizance of the location as to in which one of the slices the gamma ray has been detected. Accordingly, in the arrangement illustrated, there are provided two photo-multiplier tubes 4 at the opposite ends of the crystal 3, so that by utilizing the fact that the ratio between the pulse heights of these two photo-multiplier tubes varies depending on the location of scintillation occurring within the crystal where the gamma ray has been detected, a determination is made, by a location detecting circuit 5, of that specific slice at which the detection has been effected. The detection of location of scintillation within the crystal is performed in a manner similar to that by the known Anger-type detector.

While the location detector stated above has an enhanced economical advantage in that, with an increase in the number of slices, the number of the component parts employed can decrease accordingly, it is not possible to avoid the trend of increase in errors in the determination of location of a slice, due to such limitation in the location-resolving ability that is peculiar to the Anger-type detector.

SUMMARY OF THE INVENTION

It is, therefore, an object of the present invention to provide an apparatus for detecting the location of incident radiation which can determine the location of incident radiation with a high reliability.

Another object of the present invention is to provide an apparatus for detecting the location of incident radiation of the type described above which comprises at least one assembly consisting of: a scintillation crystal; a pair of photo-multiplier tubes having their photo-cathodes optically coupled to a certain surface of said scintillation crystal; a shielding means covering the scintillation crystal and the photo-multiplier tubes to shutter them from external lights; a reflector layer disposed between said shielding means and those surface portions of the scintillation crystal covered by this shielding means; and a location detecting means coupled to the photo-multiplier tubes to specify, by virtue of the respective outputs of the photo-multiplier tubes, the location at which a scintillation has taken place, wherein said scintillation crystal is comprised of at least three crystal segments, and the respective crystal segments are coupled to each other in such manner that any scintillation taking place in any one crystal segment will cause the photo-multiplier tubes to deliver substantially a same output irrespective of the location of illumination occurring therein and also that the individual scintillation occurring in the respective crystal segments will cause the photo-multiplier tubes to deliver outputs which are different in magnitude relative to each other.

BRIEF DESCRIPTION OF THE DRAWINGS

FIGS. 7 to 9 are diagrammatic illustrations showing another embodiment of the apparatus for detecting the location of incident radiation according to the present invention, in which:

FIG. 7 is a diagrammatic perspective view, partly broken away,

FIG. 8 is a diagrammatic sectional view taken along the line VIII—VIII in FIG. 7, and FIG. 9 is a diagrammatic sectional view taken along the line IX—IX in FIG. 8.

DETAILED DESCRIPTION OF THE PREFERRED EMBODIMENTS

Figure 1:
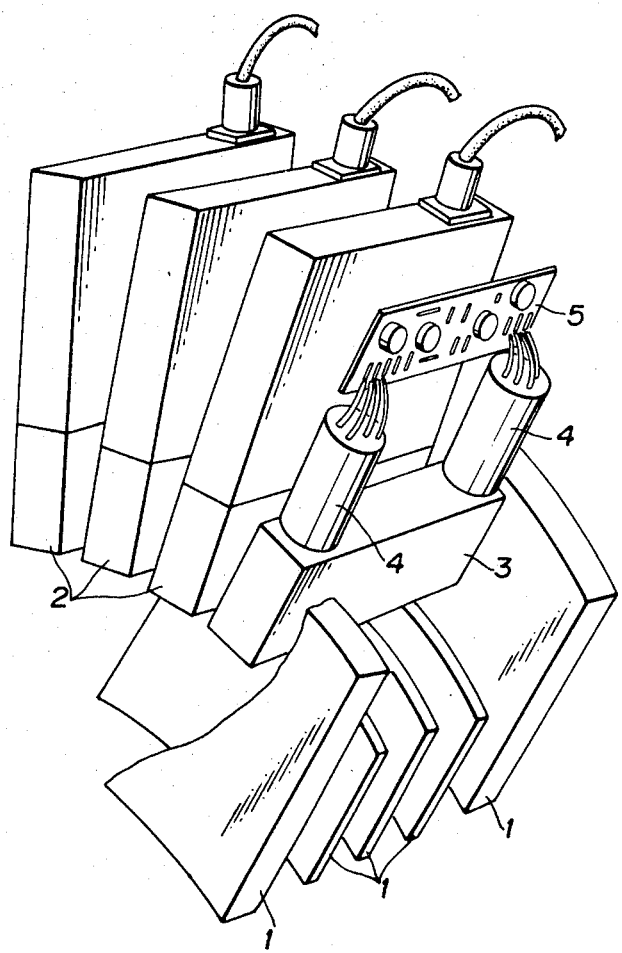
FIG. 1 is a diagrammatic perspective view of a conventional device for detecting the location of incident radiation which is constructed as being of the emission computed tomography type detector.

The apparatus for detecting the location of incident radiation according to the present invention has at least one scintillation crystal consisting of a plurality of individual crystal segments arranged side by side. The crystal per se which is employed in the present invention is such one that, upon incidence of a charged particle thereinto, a light ray of an appropriate wavelength is emitted from the crystal as a sequential trend of phenomenon of excitation of molecules and their subsequent relaxation. They are, for example, $Bi_4Ge_3O_{12}$, CsI(Tl), LiI(Eu) and like inorganic crystal, an organic crystal such as anthracene and stilbene, and a plastic scintillator prepared by fusing a light-emitting substance in a plastic. Each crystal segment normally has a rectangular box-like configuration. A scintillation crystal is composed of a plurality of crystal segments which are arranged in a row in such manner that a surface of one crystal segment abuts a surface of an adjacently disposed crystal segment. The respective crystal segments are so coupled to each other in such manner that a scintillation or illumination occurring in any one of the crystal segments will cause its associated photo-multiplier tubes to deliver substantially a same output irrespective of any location of illumination occurring within this crystal segment and also that different outputs are delivered therefrom for scintillations occurring in the respective crystal segments. Such arrangement of crystal segments may be made, more concretely, by optical coupling of all the crystal segments involved. In such case, such items as the area of coupled surfaces of crystal segments, the thickness of the crystal segments, the mutual relationship between the refractive index of the material intervening between adjacent crystal segments and the refractive index of the crystal segments per se, and the roughness of those surfaces at the interface of adjacent crystal segments constitute parameters. Optimum conditions of these parameters require to be determined experimentally. The intervening material or the boundary layer is so selected that it has a refractive index at least not identical with that of the crystal segments, and that the boundary layer is made of such material such as silicon grease as being transparent to the spectrum scintillations occurring in the crystal segments.

NaI and $Bi_4Ge_3O_{12}$ which are widely used as scintillation crystal have refractive indice of about 1.7 and about 2.1, respectively. Silicon grease which is used to form a boundary layer has a refractive index of about 1.4~1.5. The greater the ratio of the refractive index $N_s$ of crystal segment to the refractive index $N_i$ of intervening material is, the more difficult will become the illumination occurring within the crystal segment to emit to the outside of the crystal segment, and the greater will become the tendency that the illumination of scintillation to be confined within the crystal segment. The brightness of illumination within a crystal segment has no relation to the location within the crystal segment at which this illumination takes place. Accordingly, the outputs of the photo-multiplier tubes which are optically coupled to an appropriate site of the surface of a scintillation crystal will be very close to a constant value irrespective of the location within the crystal at which a scintillation takes place. On the other hand, the presence of optically coupled surfaces of crystal segments, i.e. adjacently disposed two surfaces which are coupled together via an intervening layer, will naturally make light rays difficult to be transmitted from one crystal segment to another. In case a certain crystal segment is so positioned that a scintillation occurring therein is unable to be transmitted a certain photo-multiplier tube unless passing through an optically coupled surfaces between adjacent crystal segments including said certain crystal segment, it should be understood that, where $N_s$ is greater than $N_i$, the output of said photo-multiplier tube will naturally become small. Such trend may be desirable in general. However, an excessively small output value of a photo-multiplier tube could give rise to some inconvenience depending on cases. Thus, there is the necessity to arrange crystal segments so that a scintillation occurring in a certain crystal segment will not cause a photo-multiplier tube to deliver an excessively small output. Such condition can be brought about by parameters such as the difference in value between $N_s$ and $N_i$, the ratio between the area of coupled surfaces and the thickness of a crystal in the direction perpendicular to said coupled surface area, and surface roughness of crystal segments.

The number of crystal segments for use in forming a scintillation crystal is at least three, preferably three or four, and more preferably four. The greater this number increases, the lesser will become the number of constituting parts of the detector including photo-multiplier tubes. Conversely, however, the reliability of determination of the location of detection will decrease.

In the apparatus for detecting the location of incident radiation according to the present invention, all of the respective crystal segments which jointly constitute a scintillation crystal are optically coupled together, and two photo-multiplier tubes forming a pair may be disposed in such way that their photo-cathodes faces those two crystal segments, respectively, which are located at the opposing extreme ends of the scintillation crystal.

Figure 2:
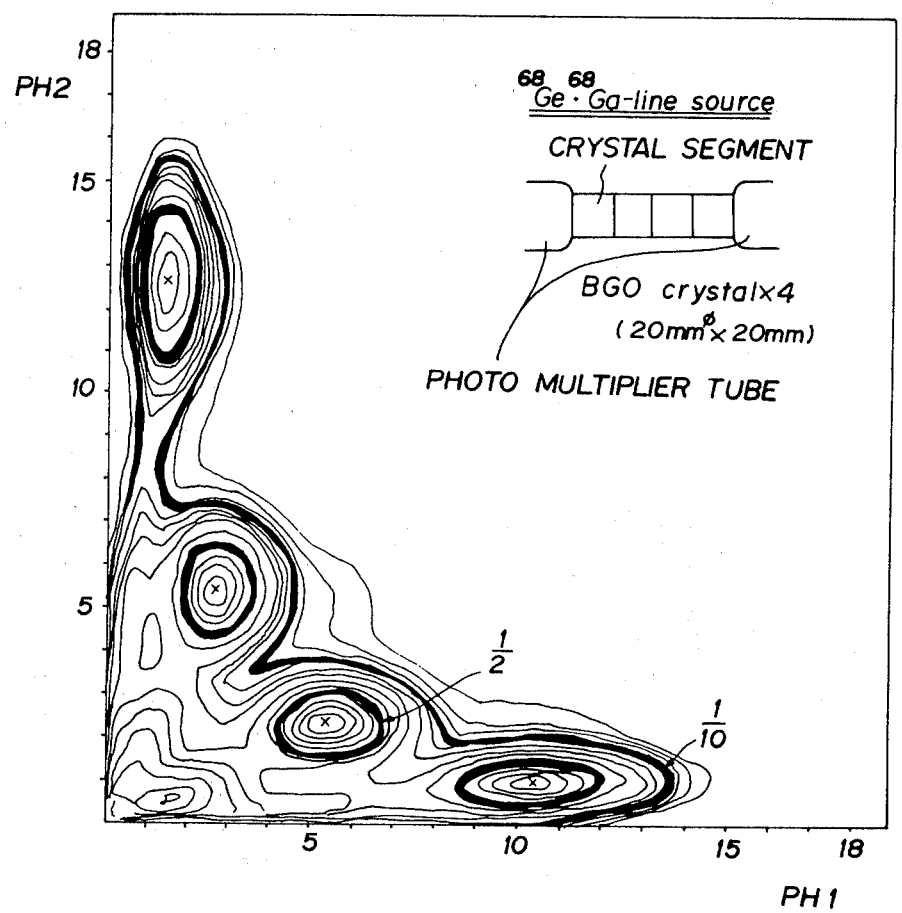
FIG. 2 is a chart showing the relationship between the pulse heights on the output side of the photo-multiplier tubes and the numbers of counts, in the apparatus for detecting the location of incident radiation embodying the present invention.

FIG. 2 shows the characteristic obtained from observation performed by two photo-multiplier tubes which are provided for two crystal segments disposed at the opposite extreme ends of a scintillation crystal, when a gamma ray is caused to irradiate uniformly onto the respective crystal segments of this row. This drawing carries brief indications of the dispositions of measurements taken. The scintillation crystal comprises a row of four monocrystal segments each being a crystal of $Bi_4Ge_3O_{12}$ (hereinafter to be referred to briefly as BGO) having the size of 20 mm$\phi \times$ 20 mm. Between respective abutting surfaces of adjacent crystal segments and between those surfaces of crystal segments abutting their associated photo-multiplier tubes, there are provided a layer of silicon grease. Also, the gamma ray supply for causing uniform irradiation of gamma ray employs a $^{68}Ga$ radiation source. The vertical axis and horizontal axis of the chart of FIG. 2 indicate the respective pulse heights of the outputs of the two photo-multiplier tubes which are provided at the opposing extreme ends of the scintillation crystal. The curves in FIG. 2 represent contour lines indicating the number of counts. In the chart, there are noted four conspicuous hills formed by closely gathered contour lines. Needless to say, two of those hills located close to the coordinate axis represent those depicted due to the gamma ray detected in the two BGO crystal segments disposed at the opposing extreme ends of the row. The intermediately located two hills represent those depicted due to the gamma ray detected in the central two BGO crystal segments. The thick lines in the chart represent those contour lines which are $\frac{1}{2}$ and 1/10, respectively, of the count in case these hills represent a count of "1". Thus, the tendency of the scintillations occurring in the respective crystal segments to gather around specific pulse heights is convenient in determining the illuminating crystal segment through analysis of the pulse heights. As such, in case it is required to locate the specific crystal segment through which the gamma ray has been detected, the present invention is outstandingly effective, and the result of detection of location is highly reliable.

Figure 3:
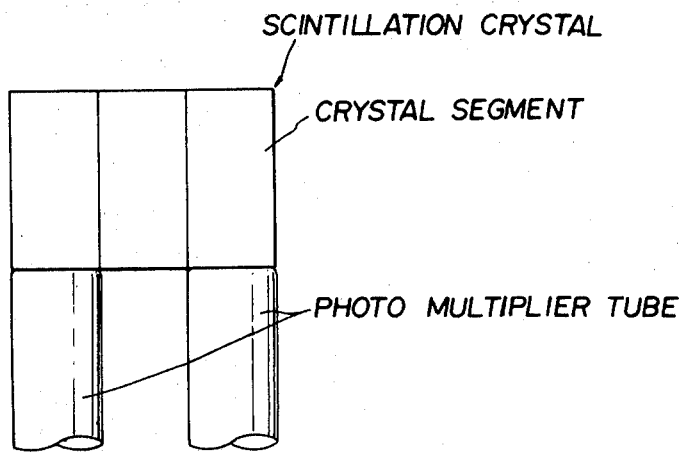
FIGS. 3 and 4 are diagrammatic illustrations for explaining other arrangements of the apparatus for detecting the location of incident radiation according to the present invention.
Figure 4:
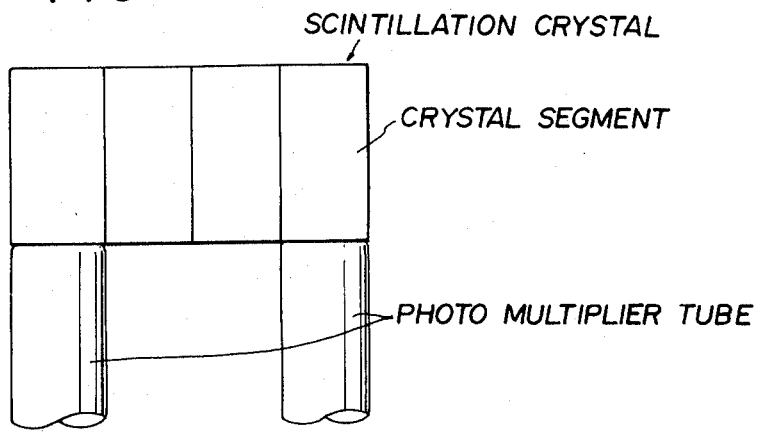

The apparatus for detecting the location of incident radiation according to the present invention may be arranged in such manner that a pair of photo-multiplier tubes are disposed so that their photo-cathodes are optically coupled to a certain surface of a scintillation crystal in a direction crossing the direction of arrangement of its respective component crystal segments. For example, as shown in FIGS. 3 and 4, all of those crystal segments constituting a scintillation crystal are optically coupled together, and a pair of photo-multiplier tubes are optically coupled at their photo-cathodes to the opposite terminal crystal segments of the row in such manner that the central axis of the respective photo-multiplier tubes of the pair are parallel with the optically coupled surface line of these crystal segments. These photo-multiplier tubes are connected to a location detecting device. In such arrangement also, there can be obtained a characteristic closely resembling that shown in FIG. 2.

Those output pulses gathering at the four hill portions in FIG. 2 are those included in the so-called photo-peaks in ordinary gamma ray measurement, and they are utilized in effecting gamma energy selection. However, by giving reference to the output of any signal photo-multiplier tube, these photo-peaks, in the present invention, mean that the pulse height differs for every illuminating crystal segment. Thus, it is difficult to make energy selection easily with respect to all of the crystal segments. If the peaks of the four hills lie on a single rectilinear line which is inclined at 45° relative to either the vertical or horizontal axis in FIG. 2, the pulse heights of the respective sums of the outputs of the two photo-multiplier tubes for each of the four scintillations which are represented by the peaks of the four hills will become constant. Accordingly, if a sum of the outputs of two photo-multiplier tubes is considered, the photo-peaks based on all of these four crystal segments will be noted to overlap each other, and thus, energy selection can be accomplished by means of a pulse height analyzer which is used in ordinary pulse height analysis. However, in the embodiments of FIGS. 3 and 4, the peaks of the four hills is not aligned on a rectilinear line, and the central two peaks are always deflected from the abovesaid rectilinear line and to lie closer to the origin of the coordinate system. In such instance, the photo-peaks caused by the scintillations of the central two crystal segments are smaller in level than those due to the outer two crystal segments. Therefore, if the outputs of the photo-multiplier tubes are applied simply to a pulse height analyzer, there will be resulted degradation of energy resolution, and thus no good energy selection will be realized.

However, such problem or inconvenience can be improved, in an apparatus having the arrangement that a pair of photo-multiplier tubes are coupled to crystal segments so as to cross the direction of arrangement of these crystal segments, by arranging so that a larger part of the photo-cathodes thereof are coupled to those crystal segments disposed at both end portions of the scintillation crystal, and that the remaining part of the photo-cathodes is coupled to their adjacently located crystal segments.

Figure 5:
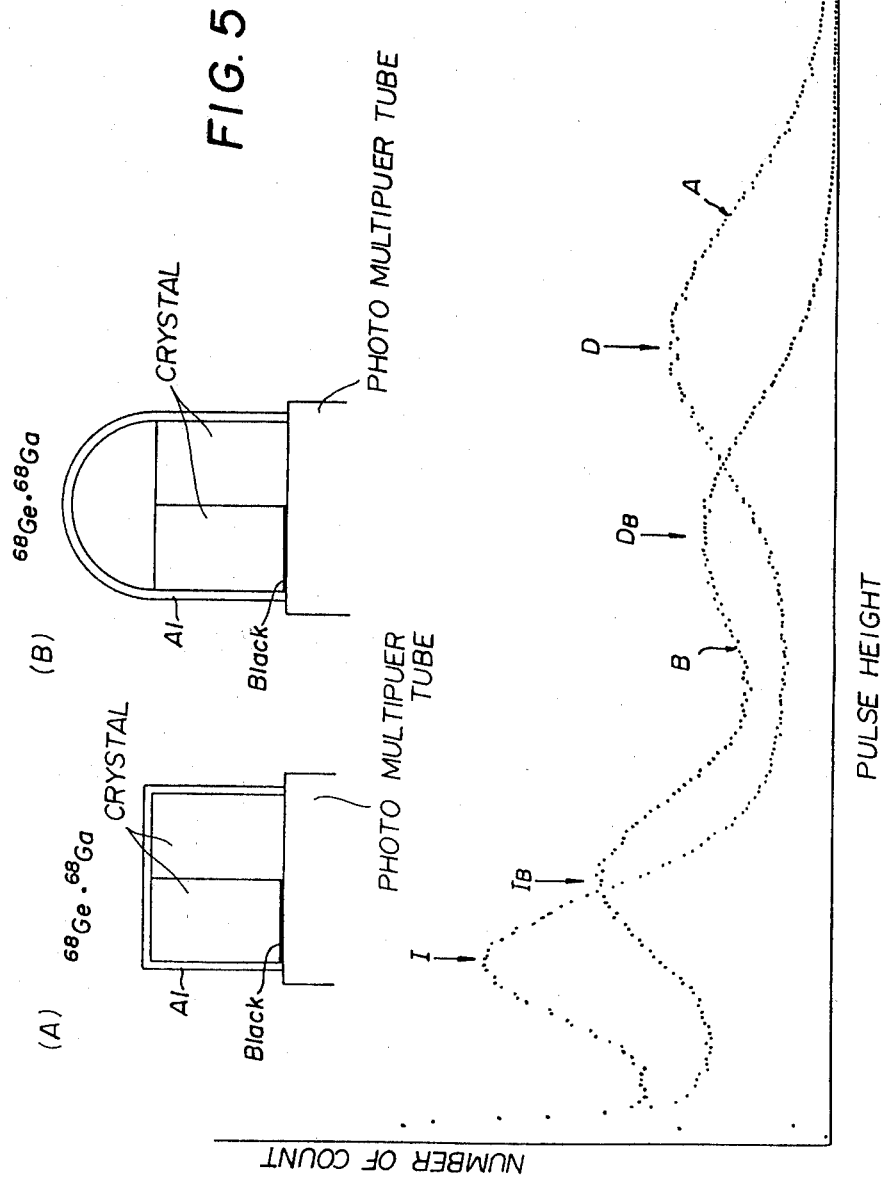
FIG. 5 is an illustration including a chart, showing the relationship between the pulse heights on the output side of the photo-multiplier tubes and the numbers of counts, to explain the apparatus for detecting the location of incident radiation according to the present invention.

This means that the respective photo-multiplier tubes shown in FIG. 4 are disposed to be slightly shifted in position in such directions that they approach each other to insure that their photo-cathodes can cover not only the surfaces of those crystal segments disposed at both ends of the row, but also a part of each of their adjacent inner crystal segments. In such arrangement of photo-multiplier tubes, the scintillation occurring in either one of the inner crystal segments not only will enter into a photo-multiplier tube after passing through its adjacent outer crystal segment, but a part of such scintillation will impinge directly onto the same photo-multiplier tube, thus that much intensifying the output of this photo-multiplier tube. A scintillation occurring in an outer crystal segment will almost impinge onto the photo-multiplier tube. Owing to such arrangement as stated above, only those central two hills in FIG. 2 will become shifted of their positions in a direction away from the origin of the coordinate system. By arranging photo-multiplier tubes at appropriate positions, it becomes possible to arrange the four hills on a rectilinear line. By so doing, it becomes possible to minimize the aforesaid degradation of energy resolution. Accordingly, it becomes possible to perform energy selection with a high efficiency. Even by giving the arrangement such consideration as mentioned just above, the precision of detection of location will hardly degrade. Such effect can be obtained more adequately by the employment of photo-multiplier tubes having square photo-cathodes. In the location detecting apparatus according to the present invention, it should be noted that, among those boundaries defined by the respective abutting surfaces of a plurality of crystal segments which constitute a scintillation crystal and are arranged in adjacent relationship relative to each other as stated above, a specific boundary is provided with a light-shuttering means. More particularly, in case a scintillation crystal is comprised of adjacent two groups of crystal segments, those segments within the respective groups are coupled each other via an intervening scintillation-shuttering layer, i.e. light-shuttering film, whereas those adjacent crystal segments located at ends of each group are optically coupled to each other. Photo-multiplier tubes are arranged for the respective groups of crystal segments. One of the photo-multiplier tube is disposed in such manner that it is able to detect scintillation occurring in one group and also a scintillation occurring in a crystal segment positioned at an end of the adjacent group. The other photo-multiplier tube is able to detect scintillation occurring in the other group and a scintillation occurring in a crystal segment positioned at an end of its adjacent group. A location detecting unit is connected to a pair of such photo-multiplier tubes. A scintillation could take place in two ways, i.e. an instance where a scintillation impinges into a photo-cathode directly from the illuminating crystal segment and the instance in which a scintillation first impinges into a neighboring crystal segment and then therefrom into the photo-cathode of the tube. If these two instances can be made independent, it will become possible to perform the detection of location of a scintillation by the use of photo-multiplier tubes smaller in number than the number of the crystal segments. The manner of separate detections between direct irradiation and indirect irradiation is shown in FIG. 5. In (A) of the Figure which is in the upper left corner thereof, arrangement is made so that a single photo-multiplier tube directly embraces one crystal segment, whereas another adjacent crystal segment is provided, at its surface portion facing the photo-cathode, with a light-shuttering film indicated by Black, so that this photo-multiplier tube is able to take information only through the first-mentioned crystal segment. The horizontal axis of the chart of FIG. 3 represents the pulse height of the output of the photo-multiplier tube, and the vertical axis represents the number of counts. It will be clear that the two peaks of the pulse height represent that the one marked by D is the value detected through that crystal segment through which the radiation directly impinges into the tube, and that I represents the value detected by way of the light-shuttered crystal segment. Thus, this chart shows that it is possible to separate those informations of gamma rays detected through these two crystal segments, relative to each other.

In the apparatus for detecting the location of incident radiation according to the present invention, the ratio of pulse heights between the directly impinging radiation and the indirectly impinging radiation is susceptible to the effect of dimensions of the respective crystal segments. In view of the presence of such range of said ratio as is convenient in practice, it is adjusted by an appropriate selection of the surface conditions of the crystal segments. However, it should be noted that, as the depth of a certain crystal segment which is perpendicular to the area of the interface of optically coupled crystal segments increases as compared with said area, the indirect incident radiation will become smaller as compared with the direct incident radiation. Accordingly, depending on the dimensions of crystal segments, there could arise an instance wherein adjustment cannot be accomplished only by relying on the surface conditions of the crystal segments. As shown at (B) in the upper left side of FIG. 5, by further intensifying the optical coupling of two crystal segments by, for example, forming an optical bypath such as by an acryl resin or by a gasified space on top of the optically coupled two crystal segments, the pulse height of the indirectly incident radiation becomes relatively great. This arrangement is effective in case the pulse height of the indirectly incident radiation is excessively small.

Figure 6:
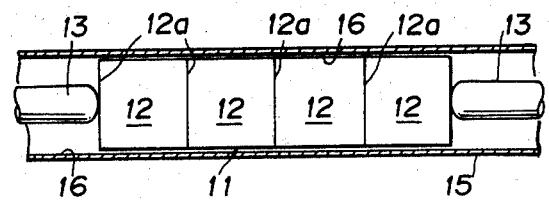
FIG. 6 is a diagrammatic explanatory illustration, provided in section, showing the structure of an embodiment of the apparatus for detecting the location of incident radiation according to the present invention.

FIG. 6 shows a concrete arrangement of the apparatus for detecting the location of incident radiation according to the present invention. Four crystal segments 12 are each comprised of a BGO crystal of 15 mm × 30 mm × 30 mm. These four crystal segments are optically coupled together via a boundary layer 12a made of a silicon grease provided at those surfaces of 15 mm × 30 mm, respectively, to provide in general a rod-like scintillation crystal 11. The photo-multiplier tubes 13 which are provided at both extreme ends of this rod-like scintillation crystal 11 each has an outer diameter of 12.7 mm, and these tubes attached to a scintillation crystal in such way that their photo-cathodes are optically coupled to those crystal segments disposed at both ends of this scintillation crystal. These tubes are positioned to these crystal segments by appropriate fixing means not shown, and their outputs are passed through a preamplifier not shown and therefrom to circuitry not shown assigned to generate signals, to effect energy selection and to perform detection of location of scintillation. Both the crystal and photo-multiplier tubes are insulated from external lights by being enclosed in a container 15 which is made of an aluminum plate of 0.5 mm in thickness. Those portions of the rear side of the container 15 located close to the crystal are applied with a light-reflecting material 16 which is made of barium sulfate or alumina. This ligh-reflecting material serves to reflect those rays of scintillation emitting from the side surfaces of the crystal and entering again into the crystal. The location detectors described above may be arranged in plural sets of a ring form parallel with the direction of alignment of respective component crystal segments to construct a ring detectors of the so-called positron CT apparatus or single photo-emission CT apparatus (hereinafter these two are called generally as ECT). Such ring detector is able to measure multiple slices.

Figure 7:
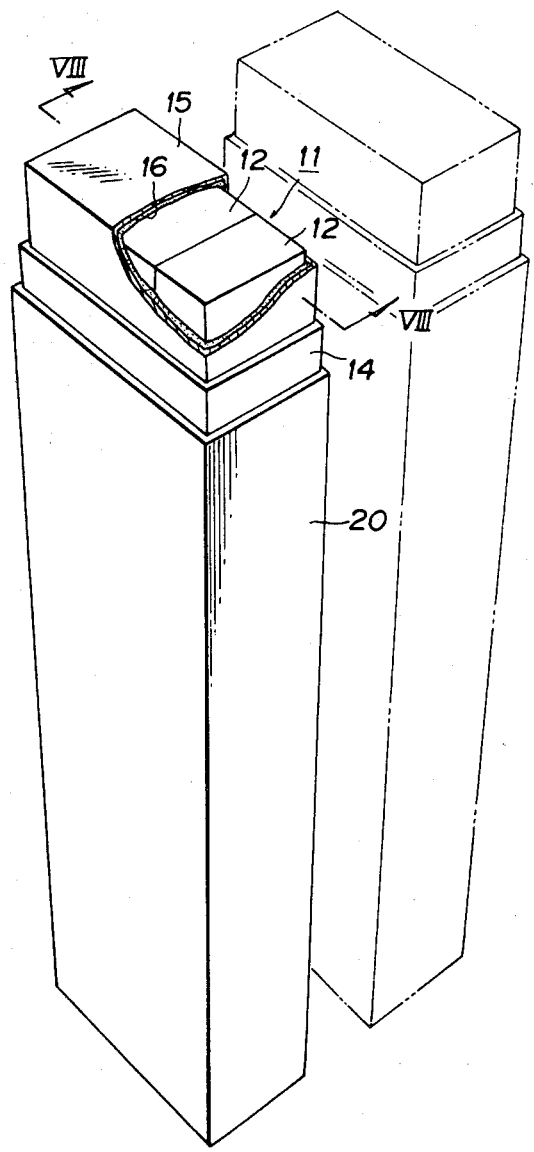
Figure 8:
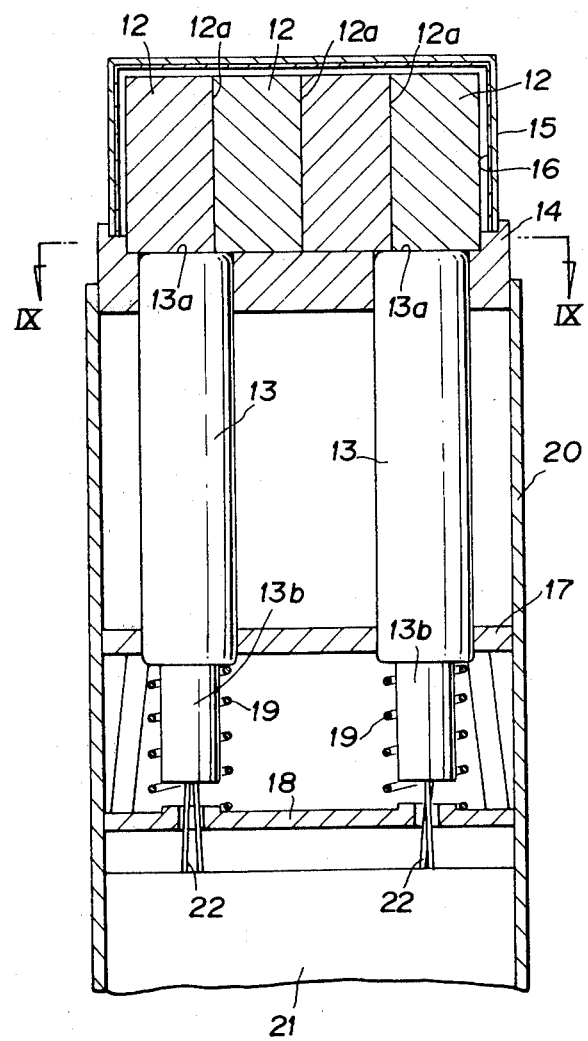
Figure 9:
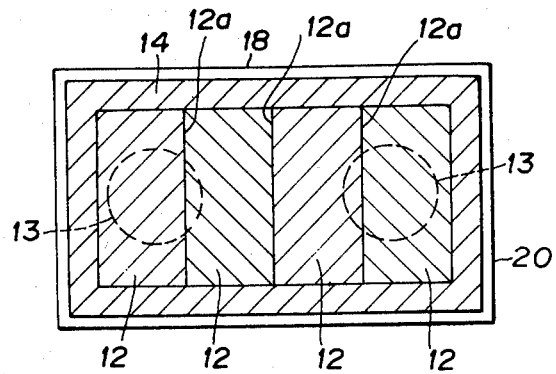

FIGS. 7 to 9 show a concrete structure of another embodiment of the apparatus for detecting the location of incident radiation according to the present invention. Reference numeral 11 represents a scintillation crystal comprised of a plurality of crystal segments 12; and 13 represents a photo-multiplier tube. The respective crystal segments are arranged, with their one surfaces abutting each other. The respective photo-multiplier tubes are disposed so as to cross the derection of the row of the respective crystal segments of the scintillation crystal, and in such manner that their photo-cathodes 13a are optically coupled to the scintillation crystal.

Both the scintillation crystal and the photo-multiplier tubes are enclosed in a frame 14. A cap 15 is mounted on the scintillation crystal to cover it, and is fixedly received in the frame 14 by an appropriate fixing means such as bonding agent. Both the scintillation crystal and the photo-cathodes of the photo-multiplier tubes are shuttered from external lights by said frame and the cap. A reflecting material 16 such as powder of magnesium monoxide (MgO) is applied onto the inner side of the cap.

Coil springs 19 are applied between a spring support plate 18 which is parallel with the frame 17 and the respective photo-multiplier tubes. These tubes are placed in position by these frames, and are urged, at their photo-cathodes, against the scintillation crystal by the coil spring 19. An outer casing 20 is fitted to the outside of the frames 14 and 17 and the spring support plate 18, to optically shield the photo-multiplier tubes and concurrently protect them. A box 21 for accommodating electric circuit such as location detecting circuit is also housed in this outer casing 20. The photo-multiplier tubes are electrically connected to such electric circuit by lead wires 22. The photo-multiplier tubes each has an integral leg-portion 13b which contains therein a breeder (a voltage-divider network comprised resistors) for determining each dinode voltage. High voltages are supplied to the photo-multiplier tubes through certain lead wires, the outputs of these tubes are connected to the location detecting circuit contained in the box 21 through different lead wire.

The respective crystal segments are each cubic BGO crystal of 15 mm × 30 mm × 30 mm in size. These crystal segments are arranged in a rectilinear row with their surfaces of 30 mm × 30 mm abutting each other, and they are optically coupled to each other via a boundary layer 12a which is made of a silicon grease or a transparent silicon rubber.

The photo-multiplier tubes are 16 mm in outer diameter, and they are optically coupled to those surfaces portions of 15 mm × 30 mm of the BGO crystal segments which are disposed at the extreme ends of the scintillation crystal. More particularly, the photo-multiplier tubes are arranged so that each of their photo-cathodes overlaps to adjacent crystal segments, so as to embrace not only the outer crystal segment, but also part of inner crystal segment to thereby accomplish aligning the four hills of FIG. 2 on a single rectilinear line.

Such detector serving as unit is arranged in a large number and in a close adjacent relationship, to thereby arrange all of the component crystal segments on a single rectilinear line or on a curved line. Thus, a plurality of such radiation detectors may be used to form a single ring-form apparatus, whereby there may be constructed a ring detector for a single slice in an emission type CT apparatus. Also by providing a plurality of such ring detectors in parallel, there may be constructed an apparatus for detecting the location of incident radiation for use in emission CT apparatus which is capable of taking measurement of a plurality of slices simultaneously.

Figure 10:
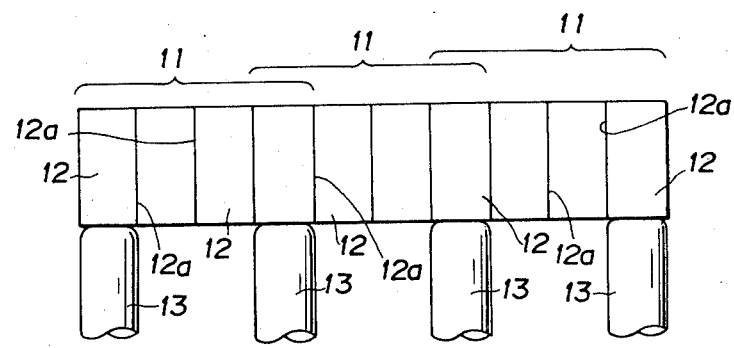
FIG. 10 is a diagrammatic explanatory illustration showing the arrangement of scintillation crystals and their associated photo-multiplier tubes in still another embodiment of the apparatus for detecting the location of incident radiation according to the present invention.

Also, a number of such location detectors may be arranged in such manner that the orientation of arrangement of the respective crystal segments in the respective detectors is parallel with each other as shown by two-dots-chain lines in FIG. 7, to thereby form a single ring and to construct a series of detectors in an emission CT apparatus. The rings formed by the respective crystal segments in the respective scintillation crystals constitute detectors each embracing a single slice. In other words the thickness of each crystal segments in the direction of the coupled adjacent crystal segments corresponds to the thickness of a slice or the interval between two adjacent slices. The apparatus for detecting the location of incident radiation shown in FIG. 10 illustrates a plurality of scintillation crystals and their associated photo-multipliers. In the Figure, a single scintillation crystal 11 and a pair of photo-multiplier tubes 13 constitute one unit. There are a plurality of such units which are arranged so that one crystal segment and one photo-multiplier tube disposed at one end of each adjacent two units constitute common members for these two adjacent units. A location detecting unit is connected to all of the adjacently disposed pairs of photo-multiplier tubes. The location of the specific crystal segment which has generated scintillation which has been detected is determined by the actions of the two photo-multiplier tubes sandwiching this particular crystal segment and also by the location detecting circuit which processes their outputs. Let us now consider a certain crystal segment and its associating photo-multiplier tube. It has been found that a scintillation occurring in a crystal segment which is located sufficiently remotely from said certain crystal segment gives only a negligible effect to said photo-multiplier tube, so that the above-mentioned arrangement becomes feasible.

Figure 11:
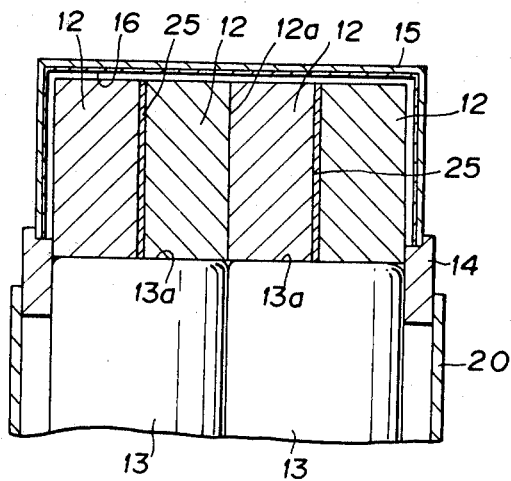
FIG. 11 is a diagrammatic explanatory illustration showing the region containing a scintillation crystal and its associated photo-multiplier tubes in a further embodiment of the apparatus for detecting the location of incident radiation according to the present invention.

FIG. 11 shows still another embodiment of the apparatus for detecting the location of incident radiation. This embodiment is arranged so that crystal segments 12 are divided into a plurality of successively arranged groups each being same in number. The crystal segments in each group are coupled together by an intervening light-shuttering layer 25. Those crystal segments which are disposed at the ends of each group are optically coupled to each other by an intervening boundary layer 12. One photo-multiplier tube 13 is optically coupled, at its photo-cathode 13a, to a single scintillation crystal in such way that as is able to detect a scintillation occurring in a crystal segment in one group and also a scintillation occurring in a crystal segment in the adjacent group which is optically coupled to the crystal segment in said one group, and also that the other photo-multiplier tube is able to detect a scintillation occurring in a crystal segment in said adjacent group and a scintillation occurring in a crystal segment in said one group optically coupled thereto. The pair of photo-multiplier tubes is connected to locaiton detecting unit.

The scintillation crystal is comprised of four closely arragned BGO crystal segments of 15 mm×30 mm×30 mm. However, the boundaries between the BGO crystal segments located at the extreme ends of the row and the central two BG0 crystal segments are each blocked from lights by a light-shuttering layer 25 which is made of a thin aluminum foil or an applied film of a light-reflecting material having such thickness as will not allow the transmission of light. The abutting surfaces of the centrally-located two crystal segments are optically coupled together by a boundary layer 12a made of a material such as silicon grease. Two photo-multiplier tubes 13 each having an outer diameter of 29 mm$\phi$ are each disposed so as to embrace one pair of two BGO crystal segments which are coupled together, with their boundary being shuttered from light. In the Figure, the four BGO crystal segments are assigned their numbers as 0, 1, 2 and 3 successively, starting at the segment located on the extreme left side. A scintillation generated in the BGO crystal segment 0 or 3 will cause only the left-side photo-multiplier tube or the right-side tube to deliver an output. A scintillation occurring in the crystal segment 1 impinges directly into the left-side photo-multiplier tube. This scintillation will enter indirectly into the right-side photo-multiplier tube via the crystal segment 2. As shown in FIG. 5, a direct incident radiation has a pulse height which is different from that of an indirect incident light. Accordingly, in case there are obtained outputs simultaneously from the photo-multiplier tubes, this means that there has occurred a scintillation in either the crystal segment 1 or 2. Thus, it is possible to determine the specific crystal segment in which this scintillation has occurred, by giving reference to the magnitude of these two outputs. Thus, this detector provides a highly reliable determination of location. Furthermore, the sum of the outputs of the two photo-multiplier tubes is such, while there still remains the trend that the outputs due to the centrally-located crystal segments appear with a small intensity, the degree of this smallness in the intensity is less than that exhibited by the preceding embodiment. This is because of the fact that all of the crystal segments are so-to-speak observed directly by the photo-multiplier tubes.

Figure 12:
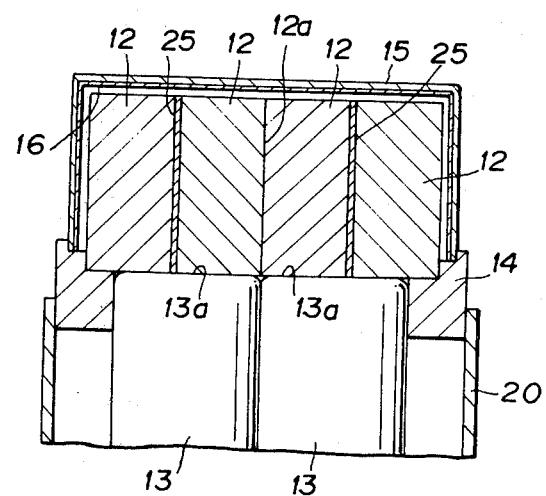
FIG. 12 is a diagrammatic explanatory illustration showing the region containing a scintillation crystal and its associated photo-multiplier tubes in a still further embodiment of the apparatus for detecting the location of incident radiation according to the present invention.

The apparatus for detecting the location of incident radiation shown in FIG. 12 differs from that shown in FIG. 11 in the diameter of the photo-multiplier tubes and also in the manner of arrangement of these tubes for the scintillation crystal. In this embodiment, the photo-multiplier tubes have a reduced diameter.

The respective photo-multiplier tubes in the respective groups are arranged in such way that they have broader areas of coverage for those crystal segments disposed on the inner side rather than for those tubes located on the outer side for making compensation for the smallness of the sum of the outputs concerning the scintillation occurring in those centrally located crystal segments. In this embodiment also, it is desirable to use square-shaped photo-multiplier tubes. The detectors of these embodiments also make it possible to fabricate a larger bank by connecting the detectors together. However, because of the provision of the light-shuttering layer, the output from such crystal segment which is disposed at a considerably remote site can be shuttered perfectly, so that no unnecessary effect is imparted to the photo-multiplier tubes.

Figure 13:
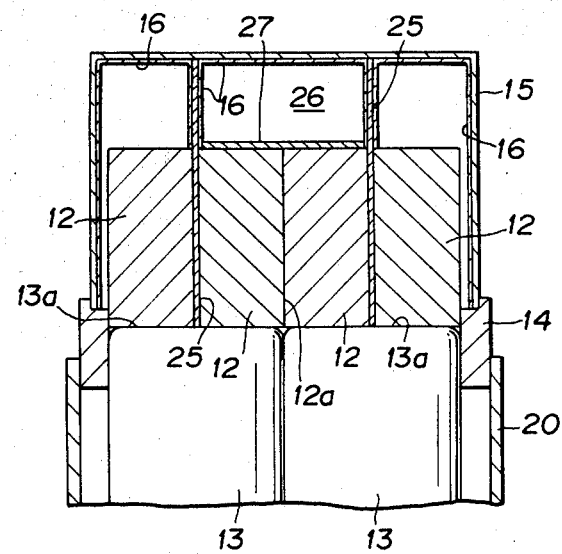
FIG. 13 is a diagrammatic explanatory illustration showing the region containing a scintillation crystal and its associated photo-multiplier tubes in a yet further embodiment of the apparatus for detecting the location of incident radiation according to the present invention.

The apparatus for detecting the location of incident radiation shown in FIG. 13 has a construction similar to that of the embodiment shown in FIG. 11. However, between the light-reflecting layer and those optically coupled crystal segments disposed at one end of the respective group there is provided an optical bypath made of material or substance transparent to scintillations occurring in the crystal segments. In this embodiment, the upper surfaces of the centrally-located two crystal segments 12 are disposed at a distance from the inner surface of a cap 15 so as to leave a sufficient space 26 therebetween. Light-shuttering layers 25 extend through this space 26 to contact the upper surface of the cap 15. The rear surfaces of both the light-shuttering layer 25 and the cap 15 are applied with a light-reflecting material 16 having a high reflecting index. With this arrangemnt, there is increased the probability of entry of that portion of scintillation escaped from the upper surface of one of the crystal segments 12 into the other crystal segment 12 after passing through the space surrounded by the light-shuttering layer and the cap and after being reflected at these surfaces thereof. Thus, optical coupling is intensified. In other words, this space constitutes an optical bypath. The optical coupling can be intensified further by, for example, applying onto the upper surfaces of the crystal segments, a material having a reflective index which is intermediate of that of the crystal and that of air, such as silicon grease or transparent silicon rubber film 27, to thereby increase the amount of light escaping into the space located above the upper surfaces of the crystal segments. This arrangement features the provision of an optical bypath between the photo-multiplier tubes and a crystal segment located away from the tubes, to thereby increase the intensity of the outputs of the photo-multiplier tubes, for a distance corresponding to this optical bypath. This arrangement may be utilized to compensate for the trend that the sum of the outputs representing the centrally located crystal segments becomes small. This location detector can be used to construct a ring-form detectors for only a single slice in an ECT, and also it may be disposed to embrace multi-layer slices. This embodiment is shown as a location detector comprising four crystal segments and two photo-multiplier tubes. It should be understood that the numbers of crystal segments and of the photo-multiplier tubes employed may be different from those mentioned above, or the detectors may be provided as a single bank or as a successively combined banks.

Figure 14:
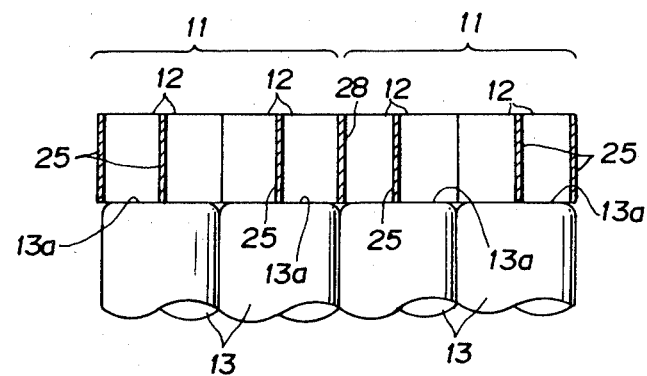
FIG. 14 is a diagrammatic explanatory illustration showing the arrangement of scintillation crystals and their associated photo-multiplier tubes in another embodiment of the apparatus for detecting the location of incident radiation according to the present invention.
Figure 15:
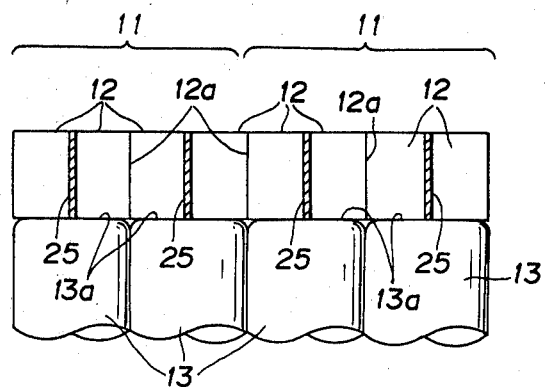
FIG. 15 is a diagrammatic explanatory illustration showing the arrangement of scintillation crystals and their associated photo-multiplier tubes in still another embodiment of the apparatus for detecting the location of incident radiation according to the present invention.
Figure 16:
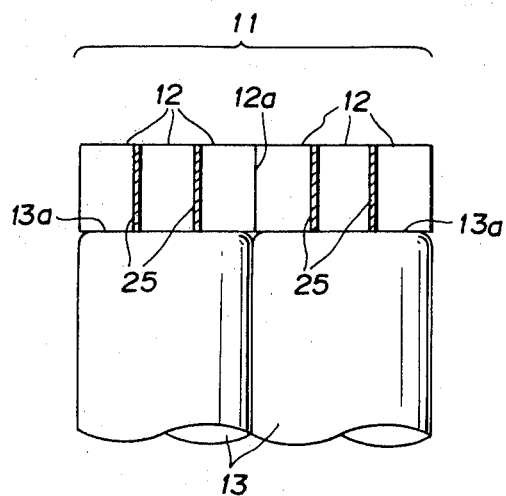
FIG. 16 is a diagrammatic explanatory illustration showing the arrangement of scintillation crystals and their associated photo-multiplier tubes in a further embodiment of the apparatus for detecting the location of incident radiation according to the present invention.

FIGS. 14 to 16 show embodiments in which the apparatus comprises a container housing a plurality of sets each being formed of a scintillation crystal and a pair of photo-multiplier tubes.

FIG. 14 illustrates only the arrangement of crystal segments 12, photo-multiplier tubes 13 and light-shuttering layers 25. This Figure shows an array of two sets of the detectors shown in FIG. 11 in the state of being removed from the container.

In this embodiment, between the two adjacent scintillation crystals is provided a light-shuttering layer 28. A location detecting unit is connected to a pair of photo-multiplier tubes in each set, but this unit is not connected for those photo-multiplier tubes separated by the light-shuttering layer 28. In this way, a plurality of such detectors may be arranged in succession to fabricate a ring detector.

In the apparatus for detecting the location of incident radiation shown in FIG. 15, each scintillation crystal 11 is comprised of four adjacently located crystal segments which, in turn, are classified into two groups each comprising two crystal segments 12. The respective two crystal segments 12 in each group are coupled together via an intervening light-shuttering layer 25. Also, those crystal segments which are located at an end of the group, i.e. in other words, those centrally-located crystal segments in the adjacently located two groups, are optically coupled together with an intervening boundary layer 12a such as silicon grease. Each of such scintillation crystal 11 and two photo-multiplier tubes 13 having their photo-cathodes optically coupled to those surface portions of the neighboring crystal segments 12 located between the two light-shuttering layers 25 jointly form one set. A plurality of such sets arranged in adjacent relationship with those crystal segments located at the respective ends of each set are optically coupled together via an intervening boundary layer 12a. This apparatus for detecting the location of incident radiation of this embodiment is such that two adjacently coupled crystal segments 12 which are shuttered from entry of light relative to each other by the light-shuttering layer 25 and one photo-multiplier tube 13 embracing these two crystal segments may be considered as one unit, and this embodiment may be considered to be constructed by a successive optical coupling of a plurality of these units. Here, the respective crystal segments shown are assigned with numbers 0, 1, 2, 3, 4, 5 starting at the crystal segment locating at the extreme left end, and the photo-multiplier tubes will be given the numbers 1, 2 and 3 starting similarly from the extreme left end. The determination of location of illumination in the crystal segment 0 is determined by its associating photo-multiplier tube 12 and also by that photo-multiplier tube 0 which is not shown but is located on the left side of said associating photo-multiplier tube 12. Similarly, the crystal segments 1, 2 or 3, 4 are determined by the photo-multiplier tubes 1, 2 or 2, 3. Such arrangement of detectors is convenient for an endless arrangement wherein the crystal segments are arranged in close adjacent relationship with each other on a closed curve, for example arranged in close contact with each other on a circular circumference. This arrangement can be made feasible by modifying somewhat the configuration of the respective crystal segments from the above-mentioned cubic configuration.

The apparatus for detecting the location of incident radiation shown in FIG. 16 is such that a scintillation crystal 11 is comprised of six crystal segments. These six crystal segments are classified into two groups each comprising three of such crystal segments. The respective three segments in each group are coupled to each other via light-shuttering layers 25, respectively. Those crystal segments located at the end of each group are photo-coupled to each other via a boundary layer 12a. A photo-multiplier tube 13 is arranged so that its photo-cathode is photo-coupled to the three crystal segments which are coupled together via the light-shuttering layer 25. A location detecting unit is connected, one for every adjacent two photo-multiplier tubes. Such detector as described above may be arranged in a plural number either in a rectilinear line or in a ring form, with those crystal segments locating at the end of the respective sets are photo-coupled together, in a manner similar to FIG. 15.

The crystal segments are assigned with numbers 0, 1, 2, 3, 4 and 5 starting at the extreme left one, and the phot-multiplier tubes are given numbers 1 and 2 in the same way, though not shown the photo-multiplier tube disposed on the left side of the tube 1 is given the number 0, and the tube disposed on the right side of the tube 2 is given the number 3. A scintillation occurring in the crystal segment 0 is outputted from the tubes 0 and 1, and scintillation occurring in the crystal segment 1 is outputted only from the tube 1. Scintillations occurring in the crystal segments 2 and 3 are outputted from the tubes 1 and 2. A scintillation occurring in the crystal segment 4 is outputted from the tube 2. A scintillation occurring in the crystal segment 5 is outputted from the tubes 2 and 3. The outputs from the crystal segment 2 or 3 is determined by either one of the tubes 1 or 2 whichever having a larger output. Unlike the detector arrangement shown in FIG. 14, those detecting apparatuses shown in FIGS. 15 and 16 are such that a location detecting unit is provided for each two adjacent photo-multiplier tubes.

Figure 17:
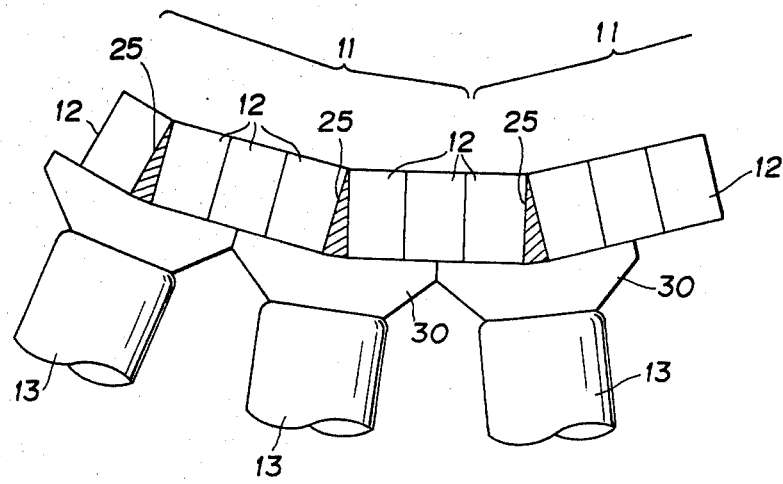
FIG. 17 is a diagrammatic explanatory illustration showing the arrangement of scintillation crystals, their associated photo-multiplier tubes and light guides in a still further embodiment of the apparatus for detecting the location of incident radiation according to the present invention.

The apparatus for detecting the location of incident radiation shown in FIG. 17 comprises light guides disposed between a scintillation crystal and photo-multiplier tubes. The scintillation crystal 11 illustrated in FIG. 17 is comprised of two groups of crystal segments, each group being formed by two optically coupled crystal segments disposed on the right side of a light-shuttering layer 25 and one crystal segment disposed on the left side of the layer 25. Those adjacent two crystal segments located at one end of each two groups are optically coupled to each other. A plurality of such groups are arranged in successive adjacent relationship, with those terminally-located crystal segments in the respective groups being optically coupled to each other. Two photo-multiplier tubes 13 are provided in such manner that one tube 13 is assigned for each group via a light guide 30. In other words, there are combined a plurality of groups each comprising three crystal segments located on the extreme left side in FIG. 17 and one photo-multiplier tube located also on the left side in the Figure embracing these three crystal segments. Let us here assign numbers to the crystal segments starting at the extreme left side as 1, 2, 3 and 4 for convenience' sake. A scintillation occurring in the second crystal 2 ought to pass through either the third crystal segment 3 or the fourth crystal segment 4 via the associated light guide 30 and enter into the associated photo-multiplier tube 13. Thus, there arises the possibility that the pulse height of the output of this tube becomes extremely small. Also, the scintillation occurring in the third crystal segment 3 is equally divided and enters into the associated photo-multiplier tube of its group and into the photo-multiplier tube of the neighboring group. Therefore, the distribution of the direct and indirect incident radiation for the first and fourth crystal segments 1 and 4 has to be selected with sufficient care. By the employment of light guides as in this embodiment, the shape of the surfaces of the crystal segments which are embraced by photo-multiplier tubes can be varied freely as required. This embodiment is one wherein the crystal segments are arranged in a ring form by utilizing the feature described just above. Also, the dimensions of the photo-multiplier tube may be freely selected. Needless to say, the employment of the light guide is not limited to this embodiment alone, but it may be applied to any other embodiments as well. It should be understood here again that a location detecting unit is provided, one each two photo-multiplier tubes as in the embodiments of FIGS. 10, 15 and 16.

The location detecting unit employed in the aforesaid respective embodiments of the apparatus of the present invention would be obvious to those skilled in the art. However, one example of such unit is illustrated FIG. 18.

This location detecting unit is comprised of a preamplifying section PA, a time signal generating section TSG, an energy selecting section ES and a location detecting section PD. Input terminals X and Y of two preamplifiers are connected to output terminals of two photo-multiplier tubes. The output stages of these tubes are provided with resistors R1 and R20 and stray capacitors C1 and C20. The preamplifying section PA is comprised of two preamplifiers as stated above each being of an identical arrangement. More particulaly, one of which is comprised of resistors R2, R3 and R4, capacitors C2, C3, C4 and C5, and an amplifier A1, and the other is comprised of resistors R21, R22 and R23, capacitors C21, C22, C23 and C24, and an amplifier A2. The amplifiers A7 and A2 each is comprised of an amplifier which is made under the model number AM 733 by advanced Micro Device Inc. of U.S.A. and has a positive terminal Q and a negative terminal $\bar{Q}$. The above said preamplifying section is such that these cosituting parts other than the preamplifiers A1 and A2, and the output stages of the photo-multiplier tubes jointly constitute an integration network having a function of eliminating thermal noises. Especially, members R1, C1 and C4 of one amplifier, and members R20, C20 and C23 of the other amplifier serve the integration function. Whereas, members C3 and R4 of one amplifier and members C22 and R23 of the other amplifier exert differential function. Members C2 and C21 both have the function of eliminating dc component. Symbol H.T. represents a high voltage supply for a photo-multiplier tube.

The above said integration network has such time constant, for example 1 ns, which is within such range as will not impair the time resolution required of a coincidence circuit not shown and this network is intended to mitigate the noise components which are essentially contained in the output signals of photo-multiplier tubes. The outputs of these integration networks are inputted, respectively, to the amplifiers A1 and A2 having their gain set at 50, and they are amplified therein. The output derived at the terminal Q of the amplifier A1 is inputted to the time signal generating section TSG and also to the location detecting section PD. On the other hand, the output at the terminal $\bar{Q}$ of this amplifier A1 is inputted to the energy selecting section ES. The output at the terminal Q of the amplifier A2 is inputted to the location detection section PD, whereas the output at the terminal $\bar{Q}$ thereof is inputted to the time signal generating section TSG and also to the energy selecting section ES.

The time signal generating section TSG is comprised of capacitors C6, C7, C8, C9, C10 and C11, resistors R5, R6, R7, R8, R9, R10, R11, R12, R13, R14 and R15, a discriminator DT, gates G1, G2 and G3, an inductance L1, and a negative power supply −B. A reference voltage $V_R$ is applied to a terminal of the resistor R6. Members R7, R8, C8 and L jointly form a delay line circuit having a delay time of Tα. Members R10, R9 and C10 form a time constant circuit. The resistor R10 is a variable resistor, and is used to control time constant. The discriminator DT employs "AM 687" made of Advanced Micro Device Inc. of U.S.A., whereas the gates G1, G2 and G3 employ "MC 10105" made by Motorola Semiconductor Products Inc. of U.S.A.. Members R14 and C11 form an integrator.

The energy selecting section ES is comprised of R24, R25, R26, R27, R28, R29, R30, R31, R32, R33, R34 and R35, capacitors C25, C26, C27, C28, C29, C30 and C31, an amplifier A3, an upper level discriminator ULD, a lower level discriminator LLD, a gate G4, an inductance L2, and diodes DD1 and DD2. Given value DL1 and DL2 represent discrimination level having the relationship of DL1<DL2. The capacitor C26 has the function of forming integration necessary for making energy and analysis of gamma ray. Members C27, C28 and L2 form a differentiation circuit. The resistors R29 and R32 serve to remove the parasitic vibrations in the upper and lower level discriminators ULD and LLD. Members R33 and C31 have the function to impart a hysteresis characteristics to the discrimination level DL. Members DD1, DD2, R30, R31 and C30 form a fixed dead time. The amplifier A3 employs a model "Am 733". The upper and lower level discriminators ULD and LLD employ a model "Am 687". The gate G4 and those gates G5, G6 and G7 which will be described later employ a model "MC 10102" made by Motorola Semiconductor Products Inc.

The location detecting circuit PD is comprised of resistors R40, R41, R42, R43, R44, R45, R46, R47, R48, R49, R50, R51, R52 and R53, capacitors C35, C36 and C37, discriminators D1, D2 and D3, and gates G5, G6 and G7. These discriminators D1, D2 and D3 employ a model "Am 687", whereas the gates G5, G6 and G7 form a unit with G4 and employ a model "MC 10102". Said discriminators D1, D2 and D3 have a latch enable terminal LE and an inverting latch enable terminal $\overline{LE}$. Members R40 and C38 form an integration circuit. The resistors R41 and R37 form an integration circuit. The capacitors C35 and C36 possess the function of removing dc component. The resistors R42, R43, R44, R45, R46 and R47 form an attenuator.

The time signal generating section TSG represents a section to form a timing signal indicating the timing of the signal of the detector. Its output is inputted to a coincidence circuit not shown but which is frequently used in general. In case, among those a plurality of detection signals which is inputted to the coincidence circuit, two of these signals are detected simultaneously, these two signals represent a pair of gamma rays from the annihilation of a position. Accordingly, it can be confirmed that this annihilation of a positron has taken place on the line connecting the two detectors.

The energy selecting section ES is comprised of a pulse height analyser which operates so that it confirms that the signals inputted to the terminals X and Y correspond to gamma rays of 510 keV, i.e. a fact that the gamma rays due to annihilation of a positron have been detected once, and that it causes the time signal generating section TSG and the location detecting section PD to operate properly only at such time that such confirmation is made.

The location detecting section PD is intended to detect the location of scintillation among the crystal segments coupled to the photo-multiplier tubes, based on the outputs delivered from the photo-multiplier tubes.

The signals outputted from the location detecting section PD are intended to make cognizance from which two crystal segments the timing segnals are generated when these timing segnals are coincident within each other, and these output signals of the PD indicate the specific position, in the memory matrix of an information collecting circuit not shown, in which the coincidence signals are to be stored.

Figure 19:
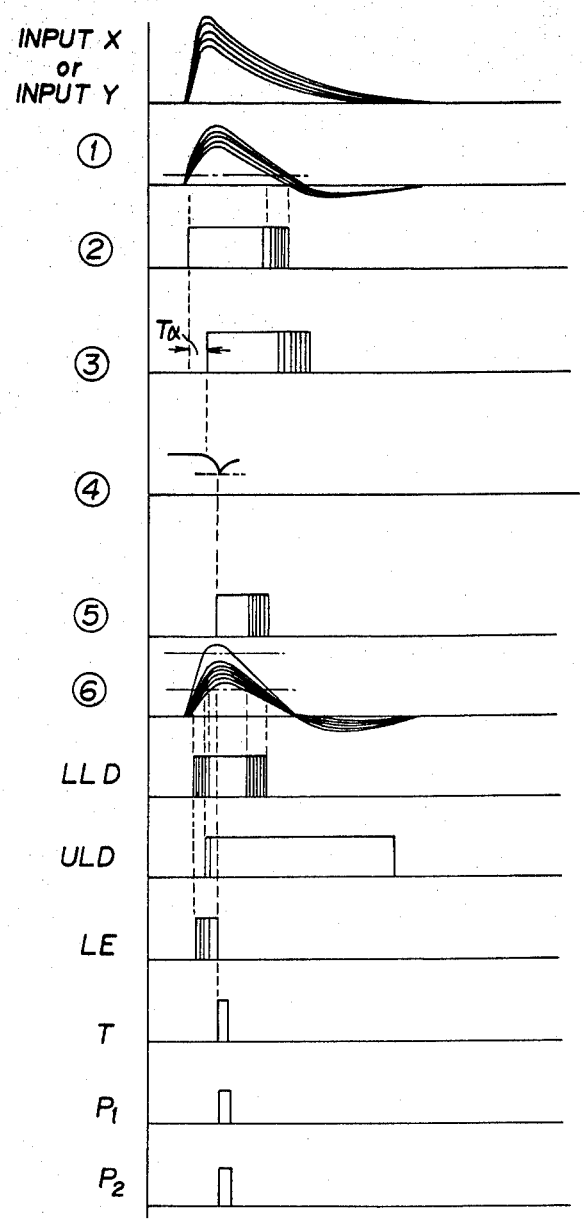
FIG. 19 is a time chart of the location detecting unit shown in FIG. 18.

Next, description will hereunder be made of the operations of the respective sections by giving reference to the time chart shown in FIG. 19.

In the time chart of FIG. 19, an input X (or input Y) represents an input signal to the terminal X or Y. The illustrated plural waveshapes of the inputs X (or input Y) represent an illustration, for convenience' sake, of plural outputs of the photo-multiplier tubes for the respective entries of gamma rays. As will be noted, these plural waveshapes have respectively different leading edge, decay and peak values. The input X (or input Y) is shown as being of a smooth waveshape. In practive, however, the waveshape is such that various high frequency noises, especially, thermal noises, are superposed. These noise waves are removed by said integration network. The waveshape illustrated represents one as input X (or input Y) which has been removed of such noise wave.

Figure 18:
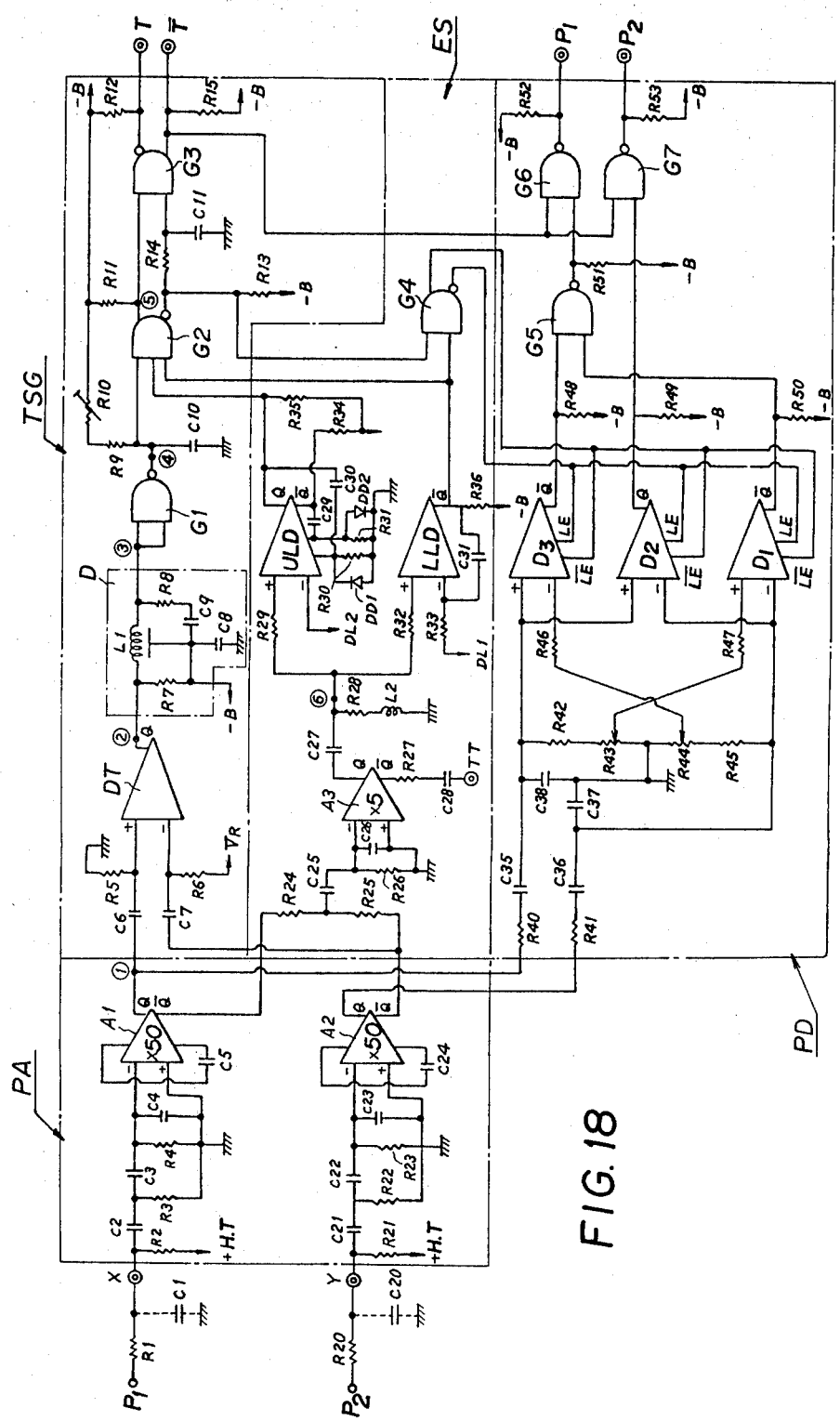
FIG. 18 is a circuit diagram, showing an example of a location detecting unit for use in the apparatus for detecting the location of incident radiation according to the present invention.

Firstly, the operation of the time signal generating section TSG will be explained. The output at terminal Q of A1 and the output at terminal $\bar{Q}$ of A2 are additively inputted to a discriminator DT having as low a threshold level as possible but higher than the noise levels of A1 and A2. The reason for this additive inputting is to effectively make use of as many available informations as possible concerning a scintillation in a crystal segment. Accordingly, the time of buildup of the output Q ② of the discriminator DT is very close to the time of generation of the outputs of A1 and A2. And accordingly, the signals inputted to X and Y, and accordingly the time of generation of a scintillation, so that said build-up time may be practically regarded as the time of generation of the scintillation. However, in order to confirm whether the output Q ② is due to the gamma rays from annihilation of the position and to detect the specific crystal segment which has generated this scintillation, a time of about 100 ns is required. Therefore, this signal ② is delayed for about 100 ns by the delay line circuit D. The leading edge of this delayed signal is used as the reference of the time of generation of a scintillation. In order to properly secure the termination of the delay line circuit, this signal is inputted to a gate G1 of a simple gate circuit formed by shorting two input terminals. This gate G1 normally is at the conductive level ("1" level), which is shifted to the cut level ("0" level) upon input of this signal. However, because a capacitor 10 is connected to an output circuit and because an active element not shown of the output stage of the gate G1 is in the cut-off state, and the capacitor C10 is charged only through the resistors R9 and R10 which are connected in series to the capacitor C10, and thus the level of G1 is shifted toward the "0" level. It takes about 20 ns before the voltage across the capacitor C10 due to this level shifting reaches threshold level of the input of the gate G2. This time, however, is adjustable by the variable resistor R10 connected thereto. This variable resistor is provided because of the consideration that, since a number of circuit shown in FIG. 18 is used, the irregularity of the characteristics of the respective constituting elements are to be compensated for the thereby uniformalize the timing of all the circuits involved. The other two inputs of the gate G2 are connected to the output terminals of LLD and ULD of the energy selecting section ES. Normally, LLD is at "1" level, and ULD is at "0" level. Accordingly, at the time when the level of the output circuit of G1 is shifted to "0" level side when LLD is shifted to "0" level and when ULD remains at "0" level (in this state, determination is made that the input represents the gamma rays due to annihilation of the positron), the gate G2 is actuated, and the level of the gate G2 returns to its initial level when either LLD or G1 has returned to its initial level. Because an integration circuit consisting of CR is inserted between the negative logic side of the output of the gate G2 and the input of the gate G3, the actuation of the gate G3 is terminated at such time that the input voltage of G3 reaches its threshold level. Accordingly, there is obtained a pulse, which is an output of the gate G3 having a width representing the length of time (10 ns) from the time of build-up the signals ⑤ still above said time. This pulse is outputted from the positive and negative terminals T and $\bar{T}$, respectively. As stated previously, these outputs are supplied, in parallel, to a plurality of coincidence circuits not shown.

In the energy selecting section ES, the respective outputs of A1 and A2 are additively supplied to this section and these outputs are appropriately integrated by the CR network, and then they are inputted to the amplifier A3 having a gain of about five times. Its output is further subjected to differentiation by a network framed with C27, R28 and L2, to be applied to the discriminators LLD and ULD. Normally, LLD is at "1" level, and ULD is at "0" level. The discrimination levels DL1 and DL2 are so set as to correspond to 350 keV for LLD and 650 keV for ULD. Accordingly, both LLD and ULD are rendered to "0" level only when the level of the signal lies between 350 keV and 650 keV. More particularly, it is at such time that the input is determined as being due to the gamma ray of 510 keV caused by annihilation of a positron. These outputs are supplied to the gate G2 of the time signal generating section TSG as stated above, causing G2 to be actuated only when the input has an energy of 510 keV. The gate G4 supplies latch signals LE and $\overline{LE}$ to the discriminator D1, D2 and D3 only when LLD and G2 are both actuated.

In the location detecting section PD, those outputs of A1 and A2 are applied to the attenuators via integration circuits as stated above. Among the four signals, two of which are those not attenuated and the other two are attenuated, any two of them are selected appropriately and inputted to D1, D2 and D3 as shown in FIG. 18. Let us here assume that the attenuation ratio on the Y signal side is a, and that on the X signal side is b (it is usual to select so as to be a=b). Then, selection is made so that:

the output of $D_3$ is $$1 \text{ when } x > aY \ldots \tag{1}$$

$$0 \text{ when } x < aY \ldots \tag{2},$$

the output of $D_2$ is $$1 \text{ when } X > Y \ldots \quad (3)$$

$$0 \text{ when } x < Y \ldots \quad (4),$$

and the output of $D_1$ is $$1 \text{ when } bX < Y \ldots \quad (5)$$

$$0 \text{ when } bX > Y \ldots \quad (6).$$

At such time,
the output of G5 is $$1 \text{ when } X < aY \text{ and } bX < Y \ldots \quad (7)$$

$$1 \text{ when } X > aY \text{ and } bX > Y \ldots \quad (8)$$

$$0 \text{ when } X > aY \text{ and } bX < Y \ldots \quad (9)$$

($X < aY$ and $bX > Y$ could not happen)

Figure 20:
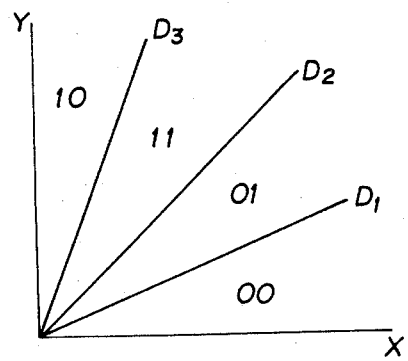
FIG. 20 is a chart for explaining the behavior of the location detecting unit shown in FIG. 18.

In FIG. 20, if the rectilinear line $D_3$ represents $Y = (-1/a)X$ and the line $D_2$ represents $Y = X$, and the line $D_1$ is expressed by $Y = (1/b)X$, Formula (3) indicates location lying within a region defined by X and $D_2$. Similarly, Formula (4) indicates the region between Y and $D_2$, Formula (7) between Y and $D_3$, Formula (8) between X and $D_1$, and Formula (9) between $D_1$ and $D_3$. Accordingly, if the outputs of the gate G5 are assumed to be $\overline{P}_1$ and $\overline{P}_2$, the signal between X and $D_1$ will be 11, the signal between $D_1$ and $D_2$ will be 10, the signal between $D_2$ and $D_3$ will be 00, and the signal between $D_3$ and Y will be 00, if their codes are expressed by $\overline{P}_2\overline{P}_1$. These codes are outputted at the terminal $P_1$ and $P_2$ as signals synchronous with the timing signal T or $\overline{T}$, by AND gates G6 and G7. However, because of the negative logic in this circuitry as stated previously, the region $X-D_1$ will become 00, $D_1-D_2$ will become 01, $D_2-D_3$ will become 11, and $D_3-Y$ will become 10. These signals are used in addressing the data memory of the data collecting circuit not shown.

What is claimed is:

1. An apparatus for detecting a location of incident radiation, comprising:
 a scintillation crystal;
 a pair of photo-multiplier tubes having their photo-cathodes optically coupled to said scintillation crystal,
 said scintillation crystal and said pair of photo-multiplier tubes forming a set;
 a location detecting means coupled to said photo-multiplier tubes for specifying, from outputs of said photo-multiplier tubes, a location within said crystal at which a scintillation has taken place,
 said scintillation crystal being comprised of at least three adjacent crystal segments arranged in a row in a first direction with two end segments being located at the respective ends of the row, each of said crystal segments being so coupled to each other to insure that a scintillation occurring in any one of the component crystal segments will cause said photo-multiplier tubes to deliver substantially the same output irrespective of the location of occurrence of scintillation in said any one crystal segment and that scintillations occurring in the respective crystal segments will cause the photo-multiplier tubes to deliver outputs different in level with each other; and
 in which the photo-cathodes of said pair of photo-multiplier tubes face in a second direction transverse to said first direction.

2. An apparatus according to claim 1, in which the respective component crystal segments are optically coupled to each other, and in which said pair of photo-multiplier tubes are arranged at opposite ends of the scintillation crystal, with their photo-cathodes facing the coupled surfaces of the crystal segments.

3. An apparatus according to claim 1, in which the respective component crystal segments are optically coupled to each other.

4. An apparatus according to claim 3, in which respective major parts of said photo-multiplier tubes are respectively coupled to said two end segments of said scintillation crystal, and respective remaining parts of said tubes being respectively coupled to crystal segments respectively disposed next to said two end segments of the scintillation crystal.

5. An apparatus according to claim 3, further comprising a plurality of said set of a scintillation crystal and said pair of photo-multiplier tubes, and in which neighboring such sets have, in common, one said component crystal segment and said pair of photo-multiplier tubes, and in which each neighboring pair of said photo-multiplier tubes is coupled to each other by one said location detecting means.

6. An apparatus according to claim 1, in which said scintillation crystal is comprised of two groups each having a same number of adjacent crystal segments,
 the respective crystal segments in each said group being coupled together via a light-shuttering layer,
 those crystal segments disposed at an end of the respective group being optically coupled together,
 one of said pair of photo-multiplier tubes being arranged to detect a scintillation occurring in any one of the crystal segments in one of the groups and a scintillation occurring in that optically coupled crystal segment contained in the neighboring group,
 the other of the photo-multiplier tube of said pair being arranged to detect a scintillation occurring in said optically coupled crystal segment contained in said neighboring group and a scintillation occurring in said any one of the crystal segments in one of the groups.

7. An apparatus according to claim 6, in which said scintillation crystal is comprised of four crystal segments.

8. An apparatus according to claim 6, in which each of said photo-multiplier tubes has a larger portion of its photo-cathode coupled to said optically coupled crystal segment and a remainder portion of the photo-cathode coupled to those crystal segments which are coupled together via a light-shuttering layer.

9. An apparatus according to claim 6, in which the plurality of sets of a scintillation crystal and the pair of photo-multiplier tubes are arranged so that those crystal segments disposed at an end of the respective scintillation crystals in the respective sets are coupled together via a light-shuttering layer.

10. An apparatus according to claim 9, in which those scintillation crystals in the respective sets are each comprised of four crystal segments.

11. An apparatus according to claim 1, comprising a plurality of sets of members where each set includes (a) said scintillation crystal being comprised of two groups each having a same number of adjacent crystal segments, (b) the respective crystal segments in each said group being coupled together via a light-shuttering layer, (c) those crystal segments disposed at an end of the respective group being optically coupled together, (d) one of said pair of photo-multiplier tubes being arranged to detect a scintillation occurring in any one of the crystal segments in one of the groups and a scintillation occurring in the optically coupled crystal segment contained in the neighboring group, (e) the other of the photo-multiplier tube of said pair being arranged to detect a scintillation occurring in said optically coupled crystal segment contained in said neighboring group and a scintillation occurring in said any one of the crystal segments in one of the groups, wherein those crystal segments disposed at an end of the respective scintillation crystals in the respective sets are optically coupled together, said apparatus and wherein each neighboring pair of said photo-multiplier tubes is coupled to each other by one said location detecting means.

12. An apparatus according to claim 11, in which those scintillation crystals in the respective sets are each comprised of four crystal segments.

13. An apparatus according to claim 11, in which those scintillation crystals in the respective sets are each comprised of six crystal segments.

14. An apparatus according to claim 6, further comprising a light-bypath means made of a material transparent to scintillations, said light-bypath means being provided between the optically coupled crystal segments and the light-reflecting layer.

15. An apparatus according to claim 14, in which said light-bypath means is air.

16. An apparatus according to claim 14, in which said light-bypath means is made of an acryl resin.

17. An apparatus according to claim 5, 9, 10, 11, 12 or 13, in which the plurality of scintillation crystals are arranged to form a ring.

18. An apparatus according to any one of claims 1 to 13, in which the respective photo-multiplier tubes are coupled to the scintillation crystal via a light guide, respectively.

19. An apparatus according to claim 5, 9, 10, 11, 12 or 13, in which the scintillation crystals are arranged to form a ring, and the respective photo-multiplier tubes are coupled to the scintillation crystals via a light guide, respectively.

20. An apparatus for detecting a location of incident radiation, in which said apparatus has a plurality of sets of members where each set includes (a) a scintillation crystal;

(b) a pair of photo-multiplier tubes having their photo-cathodes optically coupled to said scintillation crystal, (c) said scintillation crystal and said pair of photo-multiplier tubes forming a set;

(d) a location detecting means coupled to said photo-multiplier tubes for specifying, from outputs of said photo-multiplier tubes, a location within said crystal at which a scintillation has taken place, (e) said scintillation crystal being comprised of at least three adjacent crystal segments arranged in a row in a first direction with two end segments being located at the respective ends of the row, each of said crystal segments being so coupled to each other to insure that a scintillation occurring in any one of the component crystal segments will cause said photo-multiplier tubes to deliver a substantially the same output irrespective of the location of occurrence of scintillation in said any one crystal segment and that scintillations occurring in the respective crystal segments will cause the photo-multiplier tubes to deliver outputs different in level with each other; and (f) in which the photo-cathodes of said pair of photo-multiplier tubes face in a second direction transverse to said first direction, and where said sets form a ring, wherein those crystal segments in the respective scintillation crystals of the respective sets are arranged in parallel with each other.

21. An apparatus as in claim 1 or 20 including a shielding means covering said scintillation crystal and said photo-multiplier tubes to insulate them from external lights and a reflector layer disposed between said shielding means and those surface portions of the scintillation crystal covered by said shielding means.

* * * * *